Feb. 16, 1937. G. E. BARNHART 2,070,705
AIRPLANE CONSTRUCTION
Filed Sept. 28, 1935 2 Sheets-Sheet 2
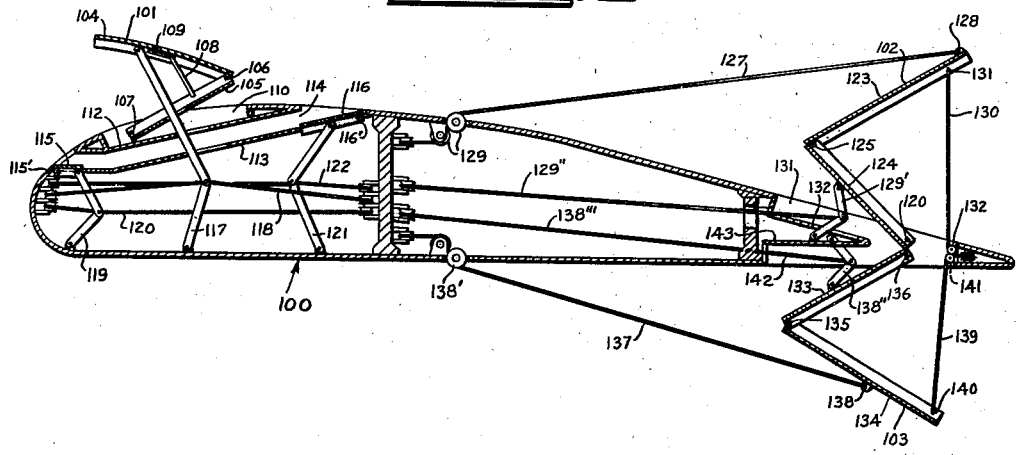
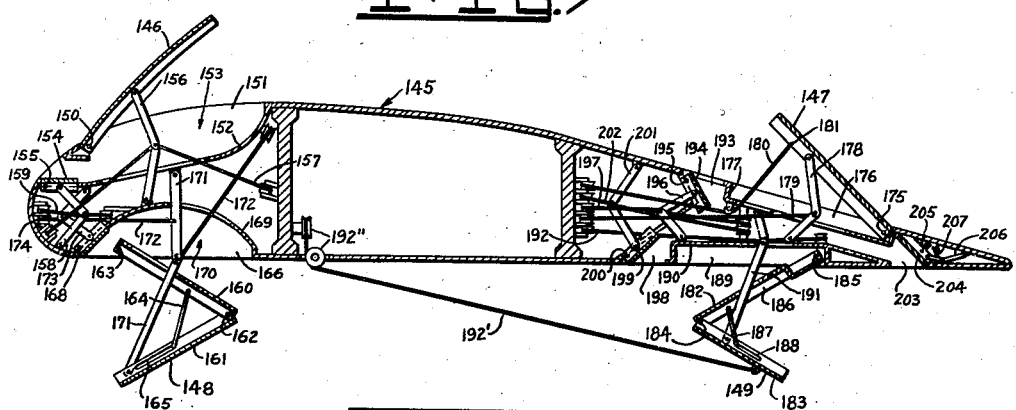
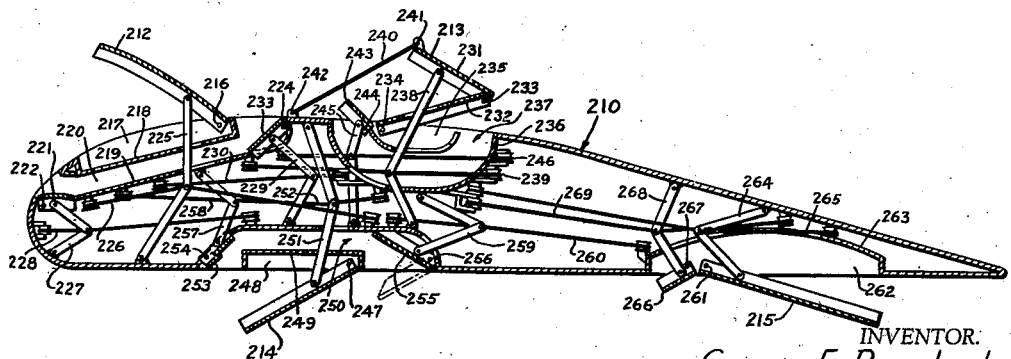
INVENTOR.
George E. Barnhart.
BY B. J. Craig,
ATTORNEY.

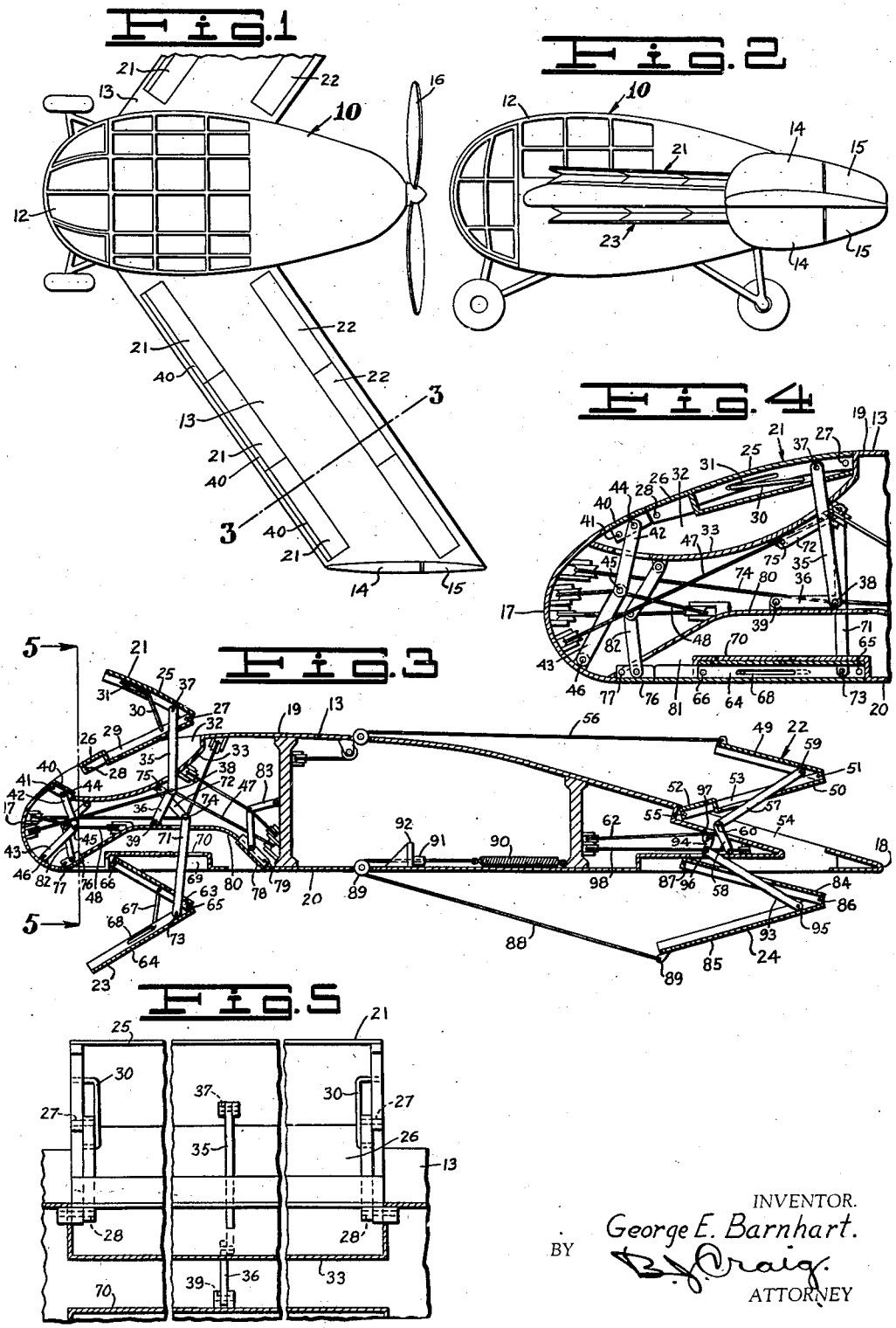

Patented Feb. 16, 1937

2,070,705

UNITED STATES PATENT OFFICE 2,070,705

AIRPLANE CONSTRUCTION

George E. Barnhart, Pasadena, Calif.

Application September 28, 1935, Serial No. 42,593

14 Claims. (Cl. 244—42)

This invention relates to improvements in airplanes.

The general object of this invention is to provide novel means for controlling the airflow over the wing of an airplane.

A more specific object of my invention is to provide a novel means enabling an airplane to gather speed at the start of the take-off by keeping the resistance low and then to increase the lift for the actual take off.

Another object of the invention is to provide novel lateral balance control for an airfoil.

Still another object of the invention is to provide novel means for effecting lateral control or longitudinal control of an airplane by projecting a surface upward or downward into the air stream.

An additional object of the invention is to provide an airfoil having a control flap with novel means to reduce the effort required to operate the flap.

Another object of the invention is to provide an airplane having a control flap with novel flap means, such as a cable, which acts to take the load off of the flap.

An additional object of the invention is to provide an auxiliary air channel way disposed adjacent the flap to control or modify the operation of the flap.

Other objects and the advantages of this invention will be apparent from the following description taken in connection with the accompanying drawings wherein:

Fig. 1 is a top plane view of an airplane embodying the features of my invention;

Fig. 2 is a side elevation of the airplane shown in Fig. 1;

Fig. 3 is an enlarged section taken on line 3—3 Fig. 1 showing the flaps in an open position;

Fig. 4 is an enlarged fragmentary view similar to Fig. 3 showing the front portion of the wing and with the flaps in a closed position;

Fig. 5 is an enlarged fragmentary view taken on line 5—5 of Fig. 3;

Fig. 6 is a view similar to Fig. 3 showing a different arrangement of wing flaps;

Fig. 7 is a view similar to Fig. 6 showing another arrangement of the wing flaps, and Fig. 8 is a view similar to Fig. 7 showing a still further arrangement of the wing flaps.

Referring to the drawings by reference characters I have indicated an airplane embodying the features of my invention generally at 10. The airplane 10 is shown as of the tailless monoplane type and includes a cabin type fuselage 12, wings 13 having vertical stabilizers 14 and vertical rudders 15 thereon, and a tractor type propeller 16. It will be understood that my invention may be applied to other types of airplanes.

In general the wing 13 is of hollow construction and stream line in cross section and includes a leading edge 17 and a trailing edge 18, an upper surface 19 and a lower surface 20.

Adjacent the leading edge 17 of the wing 13 in the upper surface 19 thereof I provide a plurality of flaps 21 and adjacent the trailing edge 18 in the upper surface I provide a plurality of flaps 22 while adjacent the leading edge of the wing in the lower surface 20 thereof I provide a plurality of flaps 23 and adjacent the trailing edge in the lower surface I provide a plurality of flaps 24.

The flaps 21 are preferably identical so I will describe but one of them. As shown in Figs. 3, 4, and 5 each flap 21 includes an upper section 25 and a lower section 26. The trailing edge of the upper section 25 is pivotally connected to the trailing edge of the lower section 26 as at 27 and the leading edge of the lower section is pivotally connected to a portion of the wing structure as at 28. When the flap is open as shown in Fig. 3 the lower section 26 is inclined upwardly and rearwardly and the upper portion is inclined upwardly and forwardly. The upper section 25 is preferably of less length than the lower section and the lower section includes a recessed portion 29 to receive the upper section when the flap is in a closed position as shown in Fig. 4. Adjacent each end the lower section 26 includes a pivoted brace rod 30 the end portion of which is slidably positioned in an elongated aperture 31 of the upper section 25. The brace rod 30 restricts the upward travel of the upper flap section beyond a predetermined angle.

The flap 21 is positioned in a recess 32, in the upper surface of the wing. This recess has a lower wall 33 to prevent flow of air into the wing when the flap is open. When this flap is closed, as shown in Fig. 4, the flap section 25 and a portion of the section 26 form a surface which is continuous with the upper surface 21 of the wing.

For actuating the flap 21 I provide a link mechanism which includes links 35 and 36. One end of the link 35 is pivotally secured to the flap portion 25 as at 37 and the opposite end of the link 35 is pivotally secured to the link 36 as at 38 and the opposite end of the link 36 is pivotally secured to a portion of the wing structure as at 39. When the pivot 38 is shifted rearward the link 35 swings the flap 21 upward to an open position as shown in Fig. 5 and when the link pivot 38 is moved forward the link 35 swings the flap downward to a closed position as shown in Fig. 7.

Positioned in the wing aperture 30 I provide a pilot flap 40. The pilot flap 40 is pivotally secured adjacent its leading edge to the wing structure as at 41 and when open inclines downwardly and rearwardly as shown in Fig. 3.

For actuating the pilot flap 40 I provide a lever mechanism which includes a link 42 and a link 43. One end of the link 42 is pivotally secured to the flap 40 as at 44 and the opposite end is pivotally secured to the wing end of the link 43 as at 45 and the opposite end of the link 43 is pivotally secured to a portion of the wing structure as at 46. When the pivot 45 of the lever mechanism is moved rearward the link 42 swings the pilot flap downward to an open position as shown in Fig. 5 and when the pivot 45 is moved forward the link 42 swings the flap upward to a closed position as shown in Fig. 4.

For operating the control mechanism of the flap 21 suitable cable mechanism 47 which extends to the control cabin of the fuselage may be provided or any other suitable means may be provided for actuating the lever mechanism.

For operating the control mechanism of the pilot flaps 40 suitable cable mechanism 48 which extends to the control cabin of the fuselage may be provided or any other suitable means may be provided for actuating the lever mechanism.

When the operator desires to open the main flap 21 he preferably first opens the pilot flaps 40 and thereafter the main flaps 21. By opening the pilot flaps 41 these flaps direct the air stream into the housing 34 whereupon less effort is required to open the main flaps 21. When the main flaps 21 are opened the air pressure thereagainst retards the forward motion of the airplane. Furthermore, by opening various ones of the flaps the direction of the flight of the plane may be controlled and changed.

The flaps 22 are similar to flaps 21 and each includes an upper section 49 and a lower section 50. The upper section 49 is pivotally connected to the lower section 50 as at 51 and the lower section is pivotally connected to a portion of the wing structure as at 52. The pivot 51 is positioned to the rear of the pivot 52 so that when the flap 22 is in an open position as shown in Fig. 3 the lower portion is inclined upwardly and rearwardly and the upper portion is inclined upwardly and forwardly.

The upper section 49 is of less length than the lower section 50 and the lower section includes a recessed portion 53 to receive the upper section when the flap is in a closed position. The flap 22 is positioned in an aperture 54 in the upper surface of the wing so that when the flap is in a closed position the upper section 49 and a portion of the section 50 form a surface which is continuous with the upper surface of the wing. Below the flap 22 I provide a housing 55 which closes the wing aperture 54 and prevents the flow of air into the wing when flap 22 is open.

For opening the flap 22 I provide a cable mechanism 56 which extends to the control cable in the fuselage 12. For closing the flap 22 I provide a lever mechanism which includes a link 57 and a link 58. The link 57 is pivotally secured to the flap portion 49 as at 59 and the opposite end of the link 59 is pivotally secured to the link 58 as at 60 and the opposite end of the link 58 is pivotally secured to a portion of the wing structure as at 61. When the pivot 60 is shifted forward the bar 57 swings the flap 22 downward to a closed position.

For operating the lever mechanism of the flap 22 a cable mechanism 62 which leads to the control cabin of the fuselage may be provided.

Each of the flaps 23 includes an upper section 63 and a lower section 64. The upper section 63 is pivotally connected to the lower section 64 as at 65. The upper section is pivotally connected to a portion of the wing structure as at 66. The pivot 65 is positioned to the rear of the pivot 66 so that when the flap 23 is open as shown in Fig. 3 the upper portion 63 is inclined downwardly and rearwardly and the lower portion is inclined downwardly and forwardly. The lower section 64 is of greater length than the upper section 63 and when in a closed position as shown in Fig. 4 overlaps the pivoted end of the section 63.

Adjacent each end the upper section 63 includes a pivoted brace rod 67, a part of which is slidable in an elongated aperture 68 in the lower section 64. The brace rod 30 restricts the downward travel of the lower section beyond a predetermined angle. The flap 23 is positioned in a recess 69 in the lower surface of the wing so that when the flap is in a closed position as shown in Fig. 4 the lower section 64 forms a surface which is continuous with the lower surface 20 of the wing.

Above the flap 23 I provide a housing member 70 which closes the wing aperture 69 and prevents the flow of air into the wing when the flap 23 is open.

For actuating the flap 23 I provide a lever mechanism which includes a link 71 and a link 72. One end of the link 71 is pivotally secured to the flap portion 64 as at 73 and the opposite end of the link 71 is pivotally secured to the link 72 as at 74 and the opposite end of the link 72 is pivotally secured to a portion of the wing structure as at 75. When the pivot 74 is shifted forward the link 71 swings the flap 23 downward to an open position as shown in Fig. 5 and when the link pivot 74 is moved rearward the link 71 swings the flap forward to a closed position as shown in Fig. 3 and when the link pivot 74 is moved rearward the link 71 swings the flap forward to a closed position shown in Fig. 4.

Positioned in the wing aperture 69 forward of the flap 23 I provide a pilot flap 76. The pilot flap 76 is pivotally secured adjacent its leading edge to the wing structure as at 77 and when open inclines upwardly and rearwardly as shown in Fig. 3.

Positioned in the wing aperture 69 in the rear of the flap 23 I provide a flap 78. The flap 78 is pivotally secured adjacent its rear edge to the wing structure as at 79 and when open inclines upwardly and forwardly as shown in Fig. 3.

Above the housing 70 and spaced therefrom I provide a housing 80 which forms a channel 81. When the flap 23 and the pilot flap 76 are in a closed position as shown in Fig. 4 the forward end of the channel 80 is closed and when the flap 78 is in a closed position it closes the rear end of the channel 81.

For actuating the pilot flap 76 suitable link mechanism 82 similar to the link mechanism of the pilot flap 40 may be provided and for actuating the flap 78 similar link mechanism 83 may be provided. The link mechanisms 82 and 83, like the previously described flap link mechanisms may be actuated by a similar cable mechanism from the control cabin in the fuselage.

Each of the flaps 24 includes an upper section 84 and a lower section 85. The lower section 85 is pivotally connected to the upper section 84 as at 86 and the upper section is pivotally connected to a portion of the wing structure as at 87. The pivot 86 is positioned in the rear of the pivot 87 so that when the flap is open as shown in Fig. 3 the upper portion 84 is inclined downwardly and rearwardly and the lower portion 85 is inclined downwardly and forwardly.

For restricting the downward travel of the flap portion 85 beyond a predetermined angle, and also to provide means for removing a portion of the load from the flap, I provide a cable 88, one end of which is secured to the lower flap section 85 as at 89. The cable 88 enters the wing 13 over a pulley 89 and the end thereof is secured to a spring 90 which is suitably anchored to a portion of the wing structure. The cable 88 has a stop member 91 thereon which when the flap is in a fully open position engages an abutment member 92 to restrict further travel of the cable 88. When the flap 24 is moved to a closed position the spring 90 takes up the slack in the cable 88.

For actuating the flap 24 I provide a lever mechanism which includes a link 93 and a link 94. One end of the link 93 is pivotally secured to the flap portion 85 as at 95 and the opposite end of the link 93 is pivotally secured to the link 94 as at 96 and the opposite end of the link 94 is pivotally secured to a portion of the wing structure as at 97.

When the pivot 96 is shifted rearward the link 93 swings the flap 24 downward to an open position and when the link pivot 96 is moved forward the link 93 swings the flap forward to a closed position. Suitable cable mechanism 98 extending into the control cabin may be provided for actuating the link mechanism of the flap 24.

In Fig. 6 I have shown a wing at 100. In the upper surface of this wing 100 adjacent the leading edge thereof I provide a flap 101 and adjacent the trailing edge of the wing in the upper surface I provide a flap 102 and directly below the flap 102 in the lower surface of the wing I provide a flap 103.

The flap 101 includes an upper section 104 and a lower section 105. The upper section 104 is pivotally connected to the lower section 105 as at 106, and the lower section is pivotally connected to a portion of the wing structure as at 107. The pivot 106 is positioned in the rear of pivot 107 so that when the flap is open the lower portion 105 is inclined upward and rearward and the upper portion is inclined upward and forward. The lower section 105 includes a pivot brace rod 108 which is positioned in an elongated aperture 109 of the upper section 104. The brace rod 108 restricts the forward travel of the upper flap section beyond a predetermined angle.

The flap 101 is positioned in recess 110 in the upper surface of the wing so that when the flap is in a closed position the flap section 104 forms a surface which is continuous with the upper surface of the wing. Below the flap 101 I provide a housing member 112 which closes the wing recess 110 and prevents the flow of air into the wing when the flap is open.

Spaced below the housing 112 I provide a housing 113 which with the housing 112 forms a channel 114. The channel 114 opens through the leading edge of the wing forward of the flap 101 and the opposite end of the channel opens through the upper surface of the wing in the rear of the flap 101. The forward end of the channel 114 is adapted to be closed by a flap 115 and the rear end of the channel 114 is adapted to be closed by a flap 116. The flap 115 is pivotally secured adjacent its forward end to the wing structure as indicated at 115' and the flap 116 is secured adjacent its rear end to the wing structure as at 116'.

For actuating the flap 101, suitable mechanism 117 similar to the previously described mechanism of the flap 21 may be provided. The link mechanism 117 is shown as operated by suitable cables 118.

For actuating the flap 115, suitable mechanism 119 similar to the previously described mechanism of the flap 21 may be provided. The link mechanism 119 is shown as operated by suitable cables 120.

For actuating the flap 116, suitable mechanism 121 similar to the previously described mechanism of the flap 21 may be provided. The link mechanism 121 is shown as operated by suitable cables 122.

When the operator desires to open the flap 101 he preferably first opens the flap 116 then the flap 115 whereupon air striking the leading edge of the wing adjacent the flap 101 enters the channel 114, thereby relieving the air pressure on the wing adjacent the flap 101. Thereafter the operator opens the flap 101.

The flap 102 includes an upper section 123 and a lower section 124. The upper section 123 is pivotally connected with the lower section 124 as at 125. The lower section is pivotally connected to a portion of the wing structure as at 126. The pivot 125 is positioned forward of the pivot 126 so that when the flap is open the lower portion is inclined upwardly and forwardly and the upper portion is inclined upwardly and rearwardly.

For opening the portion 123 of the flap 102 I provide a cable 127 which at one end is secured adjacent the outer trailing edge of the flap portion 125 as at 128. The cable 127 enters the wing over suitable pulley devices 129 and extends to a suitable point of control.

For opening the portion 124 of the flap 102 I provide suitable link mechanism 129' which is shown as operated by a suitable cable 129''.

For closing the flap 123, suitable cable mechanism 130 is provided. The cable 130 at one end is secured to the flap portion 123 as at 131 and the cable extends into the wing and over suitable pulley devices 132 to a point of control.

The flap 102 is positioned in an aperture 131 in the upper surface of the wing so that when the flap is in a closed position the flap section 123 forms a surface which is continuous with the upper surface of the wing. Below the flap 102 I provide a housing member 132 which closes the wing aperture and prevents the flow of air into the wing when the flap 102 is open.

The flap 103 includes an upper section 133 and a lower section 134. The lower section 134 is pivotally connected to the upper section 133 as at 135. The upper section is pivotally connected to a portion of the wing structure as at 136. The pivot 135 is positioned forward of the pivot 136 so that when the flap is open the upper portion 133 is inclined downwardly and forwardly and the lower section 134 is inclined downwardly and rearwardly.

For opening the portion 134 of the flap 103 I provide a cable 137 which at one end is secured intermediate the length of the flap portion which is secured as at 138 intermediate the length of the flap portion 134. Adjacent the outer surface thereof, the cable 137 enters the wing over suitable pulley devices 138' and extends to a suitable point of control.

For opening the portion 133 of the flap 103 I provide suitable link mechanism 138" which is shown as operated by a suitable cable 138'''.

For closing the flap 103, suitable cable mechanism 139 similar to the previously described cable mechanism of the flap 102 may be provided. One end of the cable 139 is secured as at 140 to the flap portion 134 and the cable extends into the wing over suitable pulley devices 141 to a point of control.

The flap 103 is positioned in an aperture 142 in the lower surface of the wing so that when the flap is in a closed position the flap section 134 forms a surface which is continuous with the lower surface of the wing.

Above the flap 103 I provide a housing member 143 which closes the wing aperture and prevents the flow of air into the wing when the flap 103 is open.

In Fig. 7 I have indicated a wing structure 145. Adjacent the leading edge of the wing in the upper surface thereof I provide a flap 146 and adjacent the trailing edge in the upper surface I provide a flap 147. Adjacent the leading edge of the wing in the lower surface thereof I provide a flap 148 and adjacent the trailing edge in the lower surface I provide a flap 149. The flap 146 is pivotally secured as at 150 adjacent the forward end to a portion of the wing structure.

When in an open position the flap 146 is inclined upwardly and rearwardly as shown. The flap 146 is positioned in an aperture 151 in the upper surface of the wing so that when the flap is in a closed position the flap forms a surface which is continuous with the upper surface of the wing.

Spaced below the flap 146 I provide a housing member 152. The housing 152, when the flap 146 is closed, forms a chamber 153. The forward end of the chamber 153 opens through the leading edge of the wing and is adapted to be closed by a flap 154. The flap 154 is pivotally secured adjacent its forward end to a portion of the wing structure as at 155. When the flap 154 is in a closed position it forms a surface which is continuous with the outer surface of the wing.

For actuating the flap 146, suitable link mechanism 156 similar to the previously described mechanism of the flap 21 may be provided. The link mechanism 156 is shown as operated by suitable cables 157.

For actuating the flap 154, suitable link mechanism 158 similar to the previously described mechanism of the flap 21 may be provided. The link mechanism 158 is shown as operated by suitable cables 159.

When the operator desires to open the flap 146 he preferably first opens the flap 154 whereupon air enters the chamber 153 and alters the air pressure above the wing flap 146. Air entering the chamber 153 produces a change in the pressure on the under side of the flap 146.

The flap 148 includes an upper section 160 and a lower section 161. The lower section 161 is pivotally connected to the upper section 160 as at 162 and the upper section 160 is pivotally secured to a portion of the wing structure as at 163. The pivot 162 is positioned in the rear of the pivot 163 so that when the flap is in an open position the portion 160 is inclined downwardly and rearwardly and the portion 161 is inclined downwardly and forwardly.

The upper section 160 includes a brace rod 164 which is positioned in an elongated aperture 165 of the portion 161. The brace rod 164 restricts the downward travel of the portion 161 beyond a predetermined angle. The flap 148 is positioned in an aperture 166 in the lower surface of the wing. Positioned in the aperture 166 forward of the flap 148 I provide a flap 167 which is pivotally connected to the section adjacent its forward end to the wing structure as at 168. When the flap 168 is in a closed position it forms a surface which is continuous with the lower surface of the wing. Over the flaps 148 and 167 I provide a housing member 169 which, when the flaps are open, prevents air from entering the wing.

For actuating the flap 148, suitable link mechanism 171 similar to the previously described mechanism of the flap 21 may be provided. The link mechanism 171 is shown as operated by suitable cables 172.

For actuating the flap 167, suitable link mechanism 173 similar to the previously described mechanism of the flap 21 may be provided. The link mechanism 174 is shown as operated by suitable cables 174. When the flaps 148 and 167 are in a closed position the flaps in the housing 169 form a chamber 170 above the flaps.

When the operator desires to open the flap 148 he preferably opens the flap 167 whereupon air enters the chamber 170 and produces a downward pressure on the flap 148 which assists to move the flap 148 to an open position when the operator actuates the flap 148 to an open position.

The flap 147 is pivotally secured adjacent its rear end to the wing structure as at 175. When the flap 147 is in an open position it is inclined upwardly and forwardly as shown. The flap 147 is positioned in an aperture 176 in the upper surface of the wing so that when the flap is in a closed position it forms a surface which is continuous with the upper surface of the wing. Below the flap 147 I provide a housing member 177 which closes the wing aperture 176 to prevent the flow of air into the wing when the flap is open.

For opening the flap 147 I provide a link mechanism 178 which is actuated by suitable cables 179. For closing the flap 147 I provide a cable 180 which is secured to the flap as at 181 and extends to a suitable point of control.

The flap 149 includes an upper section 182 and a lower section 183. The lower section is pivotally secured as at 184 to the upper section 182 and the upper section is pivotally secured as at 185 to a portion of the wing structure. The pivot 184 is positioned forward of the pivot 185 so that when the flap is in an open position the upper portion 182 is inclined downward and forward and the lower section 183 is inclined downward and rearward. The lower section 183 is of less length than the upper section 182 and the upper section includes a recessed portion 186 to receive the lower portion when the flap is in a closed position. The upper section 182 includes a brace rod 187 which is positioned in an elongated aperture 188 and the lower section 183. The brace rod 187 restricts the downward travel of the lower flap section beyond a predetermined angle. The flap 149 is positioned in an aperture 189 in the lower surface of the wing so that when the flap is in a closed position the lower section 183 and a portion of the section 182 form a surface which is continuous with the lower surface of the wing.

Above the flap 149 I provide a housing member 190 which closes the wing aperture 189 and prevents the flow of air into the wing when the flap is open.

For actuating the flap 149, suitable link mechanism 191 similar to the previously described mechanism of the flap 21 may be provided. The link mechanism 191 is shown as operated by suitable cables 192.

To relieve the strain of the air pressure on the flap 149 from the link mechanism thereof I provide a bracing cable 192' which enters the wing over pulley devices 192" and extends to a suitable point of control.

Forward of the flap 147 the wing has an aperture 193 therein which opens into the space between the housings 177 and 190. The aperture 193 is adapted to be closed by a flap 194 which, adjacent its forward wing, is pivotally secured to the wing structure as at 195.

For actuating the flap 194, suitable link mechanism 196 similar to the previously described mechanism of the flap 21 may be provided. The link mechanism 196 is shown as operated by suitable cables 197.

Forward of the flap 149 the wing has an aperture 198 therein which like the aperture 193 opens into the space between the housings 177 and 190. The aperture 198 is adapted to be closed by a flap 199 which is pivotally secured adjacent its forward end to the wing structure as at 200.

For actuating the flap 199, suitable link mechanism 201 similar to the previously described mechanism of the flap 21 may be provided. The link mechanism 201 is shown as operated by suitable cables 202.

In the rear of the housings 177 and 190 the wing has an aperture 203 therein which opens into the space between the housings 177 and 190. The aperture 203 is adapted to be closed by a flap 204 which like the flap 199 is pivotally secured adjacent its rear end to a portion of the wing structure. To open the flap 204 I provide suitable cable means 205. For closing the flap I provide a link mechanism 206 which is actuated by a cable 207.

When the operator desires to open the flap 147 he preferably first opens the flap 204 and then the flap 194. When the flaps 204 and 194 are open the air stream passing through the space between the housings 177 and 190 will be partially directed through the aperture 193 into the space between the housings 177 and 190 and out through the aperture 203, thus relieving the air pressure over the flap 147, whereupon less effort is required to open this flap.

When the operator desires to open the flap 149 he preferably first opens the flap 204 and then the flap 199. When the flaps 199 and 204 are open the air stream will be partially directed through the aperture 198 into the space between the housings 177 and 190 and out through the aperture 203 thus relieving the air pressure against the under side of the flap 149 whereupon less effort is required to open the flap 149, or, if desired, the operator might open flap 194 as well as flap 199 instead of opening flap 199 and flap 204.

In Fig. 8 I have indicated a wing structure generally at 210. In the upper surface of the wing adjacent the leading edge thereof I provide a flap 212. Intermediate the flap 212 and the trailing edge of the wing in the upper surface I provide a flap 213. In the lower surface of the wing intermediate the extent thereof I provide a flap 214 and in the lower surface adjacent the trailing edge of the wing I provide a flap 215.

The flap 212 is pivotally secured adjacent its rear end to a portion of the wing structure as at 216 so that when the flap is in an open position it is inclined forwardly and upwardly. The flap 212 is positioned in an aperture 217 in the upper surface of the wing so that when the flap is in a closed position the flap forms a surface which is continuous with the upper surface of the wing. Below the flap 212 I provide a housing member 218 which closes the wing structure and prevents the flow of air into the wing when the flap is open. Spaced below the housing 218 I provide a housing 219 which with the housing 218 forms a channel 220. The forward end of the channel 220 opens through the leading edge of the wing forward of the flap 212 and is adapted to be closed by a flap 221 which is pivotally secured to the wing structure as at 222.

The rear end of the channel 220 opens through the upper surface of the wing and is adapted to be closed by a flap 223 which is pivotally secured to the wing structure as at 224.

For actuating the flaps 212, 221, and 223, suitable link mechanisms 225, 227, and 229, similar to the previously described mechanism of the flap 21, may be provided. The link mechanisms 225, 227, and 229, are shown as operated by suitable cables 226, 228, and 230.

When the operator desires to open the flap 212 he preferably first opens the flap 223 and then the flap 221, whereupon the air stream strikes the leading edge of the wing adjacent the flap 212 and enters the channel 220 thereby relieving the air pressure on the upper surface of the flap whereupon the flap 212 may be opened with less effort.

The flap 213 includes an upper section 231 and a lower section 232. The upper section 231 is pivotally connected to the lower section 232 as at 233 and the lower section is pivotally connected to the wing structure as at 234. The pivot 233 is positioned to the rear of the pivot 234 so that when the flap is open the lower portion 232 is inclined upward and rearward and the upper portion is inclined upward and forward.

The flap 212 is positioned in an aperture 235 in the upper surface of the wing so that when the flap is in a closed position the upper surface thereof is continuous with the upper surface of the wing. Below the flap 231 I provide a housing 236 which forms a channel 237. The forward end of the channel 237 opens through the upper surface of the wing forward of the leading end of the flap. The rear end of the channel 237 opens through the top of the wing within the radius of the flap so that when the flap 213 is in a closed position it closes the rear end of the channel 213 and when the flap 213 is in an open position the rear end of the channel is open.

For actuating the flap 213 I provide a link mechanism 238 which is operated by a cable device 239. To restrict the upward travel of the flap section 231 beyond a predetermined angle I provide a cable 240 which at one end is secured adjacent the leading edge of the flap section 231 as at 241 and the opposite end of the cable is suitably anchored to the wing structure as at 242. The forward end of the channel 237 is adapted to be closed by a flap 243 which is pivotally secured adjacent its rear end to the wing structure as at 244. When the flap 243 is in an open position it is inclined forwardly and upwardly as shown.

For actuating the flap 243, suitable link mechanism 245 similar to the previously described mechanism of the flap 21 may be provided. The link mechanism 245 is shown as operated by suitable cables 246.

When the operator desires to open the flap 213 he preferably first opens the flap 243 whereupon air is directed thereby into the channel 237 to vary the pressure on the under side of the flap 213, and thus change the force required to open the flap 213.

The flap 214 is pivotally secured adjacent its rear end to the wing structure as at 247. When the flap 214 is in an open position it is inclined downwardly and forwardly. The flap 214 is positioned in an aperture 248 in the lower surface of the wing so that when the flap is in a closed position this flap forms a surface which is continuous with the lower surface of the wing.

Above the flap 214 I provide a housing 249 which forms a channel 250. The forward end of the channel 250 opens through the lower surface of the wing forward of the flap 214 and the rear end of the channel 250 opens through the lower surface of the wing to the rear of the flap 214.

For actuating the flap 214, suitable link mechanism 251 similar to the previously described mechanism of the flap 21 may be provided. The link mechanism 251 is shown as operated by suitable cables 252.

The forward end of the channel 250 is adapted to be closed by a flap 253 which is pivoted adjacent its forward end to the wing structure as at 254. The rear end of the channel 250 is adapted to be closed by a flap 255 which is pivotally secured adjacent its rear end to the wing structure as at 256.

For actuating the flap 253, suitable link mechanism 257 similar to the previously described mechanism of the flap 21 may be provided. The link mechanism 257 is shown as operated by suitable cables 258.

For actuating the flap 255, suitable link mechanism 259 similar to the previously described mechanism of the flap 21 may be provided. The link mechanism 259 is shown as operated by suitable cables 260.

When the operator desires to open the flap 214 he preferably first opens the flap 255 and then the flap 253 whereupon the air stream enters the forward end of the channel 250, passing through the channel and out through the rear end thereof thereby relieving the air pressure against the under surface of the flap 214 whereupon less effort is required to open the flap 214. The flap 215 is pivotally secured adjacent its forward edge to the wing structure as at 261 and when open is inclined downward and rearward.

The flap 215 is positioned in an aperture 262 in the lower surface of the wing so that when the flap is in a closed position the flap forms a surface which is continuous with the lower surface of the wing.

Above the flap 215 I provide a housing member 263 which closes the wing aperture 262 and prevents the flow of air into the wing when the flap is open. For actuating the flap 215, suitable link mechanism 264 similar to the previously described mechanism of the flap 21 may be provided. The link mechanism 264 is shown as operated by suitable cables 265. Positioned in the aperture 262 forward of the flap 215 I provide a flap 266 which is pivotally secured adjacent its rear end to the wing structure as at 267. When the flap 266 is in an open position it is inclined downwardly and forwardly.

For actuating the flap 266, suitable link mechanism 268 similar to the previously described mechanism of the flap 21 may be provided. The link mechanism 268 is shown as operated by suitable cables 269.

When the operator desires to open the flap 215 he preferably first opens the flap 266 whereupon the flap 266 directs air through the housing 263 to relieve a downward pressure of the flap 215 whereupon less effort is required to open the flap 215.

From the foregoing description it will be apparent that I have invented novel airplane wing and control devices which are effective in operating airplanes.

Having thus described my invention I claim:

1. In combination with an airplane including a control cockpit and a supporting wing having an upper and a lower surface, a vane member hinged to each surface of said wing, said vanes being movable from closed position to open position, said wing having a channel therethrough, said channel having an exit near the rear of said vanes, said channel having openings one closely in advance of each vane whereby the vane when in open position increases the air flow through said channel.

2. The combination of an airfoil including a leading edge and a trailing edge, and a vane member, said vane member comprising a pair of sections hinged together, means to pivotally secure one of said vane sections to said airfoil so that said one section may fold upon the airfoil, said wing having a channel extending therethrough, said channel including an opening closely in advance of said vane whereby the vane when in open position increases the air flow through said channel, said channel having an exit in the rear of said vane, and means to swing said vane member outward from a position upon the airfoil.

3. In combination with an airplane including a control cockpit and a supporting wing, a plurality of vane members each comprising an inner and an outer hinged section, said inner sections being hinged to said wing, each of said vane members being movable from an unobstructive airflow position to an obstructive airflow position, said wing having channels extending therethrough, said channels including an opening closely in advance of said vanes whereby the vane when in open position increases the air flow through said channel, said channel having an exit in the rear of said vanes.

4. The combination of an airplane including a control cockpit and a supporting wing, and a vane member including two sections, a hinge connecting said sections at their end edges to form a V, a hinge connecting one of said vane sections to said wing on a hinge line in advance of said first mentioned hinge whereby the apex of the V is to the rear, said vanes being movable from closed position to open position, said wing having a channel extending therethrough, said channel including an opening closely in advance of said vane and having an exit in the rear of said vane.

5. In combination with an airfoil including a leading edge and a trailing edge, said airfoil having a recess in the surface thereof, a vane member comprising a pair of sections having their ends hinged together and positioned in said recess, means to pivotally secure one of said vane sections to said airfoil, said wing having a channel extending therethrough, said channel including an opening closely in advance of said recess whereby the vane when in open position increases the air flow through said channel, said channel having an exit in the rear of said recess, and means to swing said one vane section outward from a position in said recess, one of said vane sections being longer than the other.

6. The combination of an airplane including a control cockpit and a supporting wing, and a vane member, said vane member including an inner and an outer section, a hinge connecting said sections, means connecting one of said vane sections to said wing on a hinge line adjacent to said wing and in advance of said first mentioned hinge, whereby said hinges form a substantially V-shaped pocket, the apex of the pocket being to the rear whereby air entering the lower and middle portion of said pocket will flow forwardly over the free edge of said outer vane section, said wing having a channel extending therethrough, said channel including an opening closely in advance of said vane whereby the vane when in open position increases the air flow through said channel, said channel having an exit in the rear of said vane, and means to move said vanes.

7. In combination with an airplane having a fuselage including a control cockpit and wings extending from opposite sides thereof, a recess in one surface of said wing, a vane member positioned in said recess, said vane member comprising two sections, one of said sections being hinged to said wing structure, the other of said sections being hinged to the free end of the first section, said vanes being movable from a closed position to open position, said vanes in a closed position being folded within said recess, said wing having a channel extending therethrough, said channel including an opening closely in advance of said recess whereby the vane when in open position increases the air flow through said channel, said channel having an exit in the rear of said recess, and means in said cockpit to actuate said vanes.

8. In combination with an airfoil including a leading edge and a trailing edge, a vane member, means to hinge said vane member to said airfoil, said vane being movable from a closed position to an open position, said wing having a channel extending therethrough, said channel including an opening closely in advance of said vane whereby the vane when in open position increases the air flow through said channel, said channel having an exit in the rear of said vane and means to control the passage of air through said channel.

9. In combination with an airfoil including a leading edge and a trailing edge, said airfoil having a recess, a vane member in said recess, said vane member including two sections, means to hinge one of said sections to said airfoil, means to hinge the other end of said one section to said second section, said vane being movable from a closed position to an open position, said wing having a channel extending therethrough, said channel including an opening closely in advance of said recess whereby the vane when in open position increases the air flow through said channel, said channel having an exit in the rear of said recess and means to control the passage of air through said channel.

10. The combination of an airplane including a control cockpit and a supporting wing having a leading and a trailing edge, and a vane member having a leading edge and a trailing edge, means connecting one of said edges of said vane member to said wing whereby the vane may move into the air stream, means disposed close to said vane and within the wing and in the rear of the leading edge of the wing whereby the vane when in open position increases the air flow through said channel, said channel serving to conduct air around said vane and to deliver the conducted air at a location in advance of the trailing edge of the wing, and means to move said vane.

11. In combination with an airfoil including a leading edge, a trailing edge, an upper surface and a lower surface, said airfoil having a passageway intermediate said leading edge and said trailing edge, said passageway having an opening in one surface in the rear of the leading edge and having an exit in advance of the trailing edge, a vane member positioned closely in the rear of said passageway opening and in advance of said passageway exit, whereby the vane when in open position increases the air flow through said channel and means to hinge said vane to said one surface.

12. In an airplane having a wing including a leading edge and a trailing edge, a vane member, said vane member comprising two portions, one of said portions being pivoted to the wing and the other portion being pivoted to the first portion, said two portions being movable from a folded position on the wing to an extended position in the air stream, means on the wing and disposed in advance of the vane members for moving the vane members outwardly, and means disposed adjacent the rear of the vane members for moving the vane members inwardly.

13. In an airplane, a wing having a leading edge and a trailing edge, said wing having a passageway therethrough, said passageway having an opening near the leading edge of the wing and having an exit in the rear of the opening, a pivoted closure flap for closing the front of said passageway, a second pivoted closure flap for closing the rear of said passageway, a vane member positioned on the outer surface of the wing intermediate the length of said passageway and close to said opening whereby the vane when in open position increases the air flow through said passageway, and means operable from a location remote from said vane member and said flaps to move said vane member and said flaps.

14. In an airplane, a wing having a leading edge and a trailing edge, said wing having a recess in its upper surface and having a recess in its lower surface, said recesses being disposed adjacent the leading edge of the wing, a vane member pivoted in said upper recess and adapted to be moved from a folded position where it closes the rear end of said recess to an upper position where it is disposed in the air stream, there being a passageway leading to said upper recess, a closure member for closing said passageway, said passageway having an opening close to said vane member whereby the vane when in open position increases the air flow through said passageway, a second vane member pivoted in said lower recess, said second vane member including a plurality of hinged sections pivoted to fold within the lower recess.

GEORGE E. BARNHART.